(12) United States Patent
Kim et al.

(10) Patent No.: US 8,191,118 B2
(45) Date of Patent: May 29, 2012

(54) PRELIMINARY VERIFICATION SYSTEM WHICH HAS A AUTHENTICATION BY PHONE ON THE INTERNET ENVIRONMENT

(76) Inventors: Gwi Yeoul Kim, Bucheon-si (KR); Young Mi Cho, Seoul (KR); Jo Yoon Hwang, Uijeongbu-si (KR)

( * ) Notice: Subject to any disclaimer, the term of this patent is extended or adjusted under 35 U.S.C. 154(b) by 805 days.

(21) Appl. No.: 12/307,258

(22) PCT Filed: Apr. 23, 2007

(86) PCT No.: PCT/KR2007/001973
§ 371 (c)(1),
(2), (4) Date: Dec. 31, 2008

(87) PCT Pub. No.: WO2008/004750
PCT Pub. Date: Jan. 10, 2008

(65) Prior Publication Data
US 2009/0313681 A1    Dec. 17, 2009

(30) Foreign Application Priority Data

Jul. 3, 2006   (KR) .......................... 10-2006-0062121
Feb. 6, 2007   (KR) .......................... 10-2007-0012304
Mar. 6, 2007   (KR) .......................... 10-2007-0022197

(51) Int. Cl.
*G06F 21/00* (2006.01)
(52) U.S. Cl. .......................................................... 726/4
(58) Field of Classification Search ........................ 726/4
See application file for complete search history.

(56) References Cited

U.S. PATENT DOCUMENTS 5,987,232 A *  11/1999  Tabuki ............................. 726/5
6,731,731 B1 *  5/2004  Ueshima ....................... 379/196
2002/0059146 A1 *  5/2002  Keech ............................. 705/64
2005/0010758 A1 *  1/2005  Landrock et al. ............. 713/156
2007/0044146 A1 *  2/2007  Murase et al. ................. 726/10

* cited by examiner

*Primary Examiner* — Michael S McNally
(74) *Attorney, Agent, or Firm* — John K. Park; Park Law Firm

(57) ABSTRACT

A preliminary verification method under an Internet environment using a phone authentication service in a system including a first terminal, a web server, an authentication server, a host server, a call server and a second terminal, the method comprising the steps of: providing a preliminary transaction request generated from the first terminal to the authentication server through the web server; at the authentication server, transmitting the preliminary transaction request information to the host server, and providing preliminary transaction result information corresponding to the preliminary transaction request information from the host server to the first terminal; at the authentication server, in case of receiving a real transaction request generated from the first terminal, receiving and verifying the authentication information from the first terminal according to the electronic transaction approval, and requesting a phone authentication for the second terminal of the user of the authenticated first terminal to the call server; at the call server, generating an authentication call to the second terminal, receiving a one time password (OTP) number corresponding to the authentication call from the second terminal, generating an OTP number by the same number of an OTP device, and transmitting authentication completion information to the host server if the generated OTP number is the same with the received OTP number; and at the host server, performing the electronic transaction process according to the authentication completion information received from the call server.

17 Claims, 14 Drawing Sheets

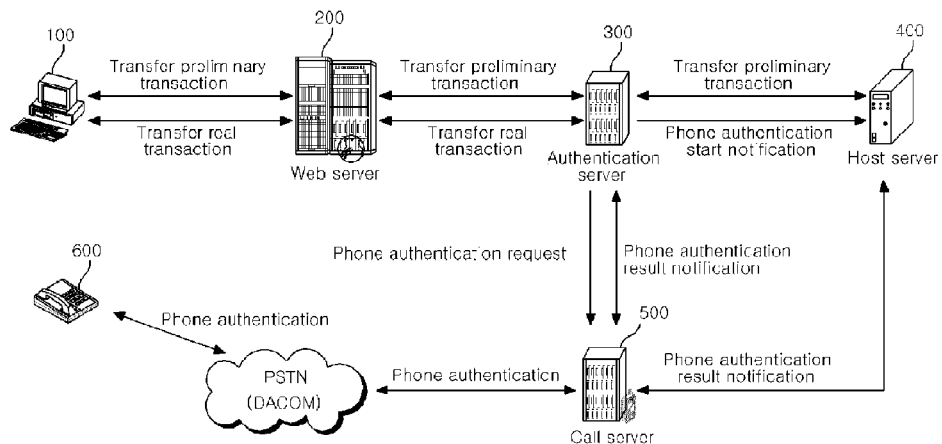
[Fig. 1]
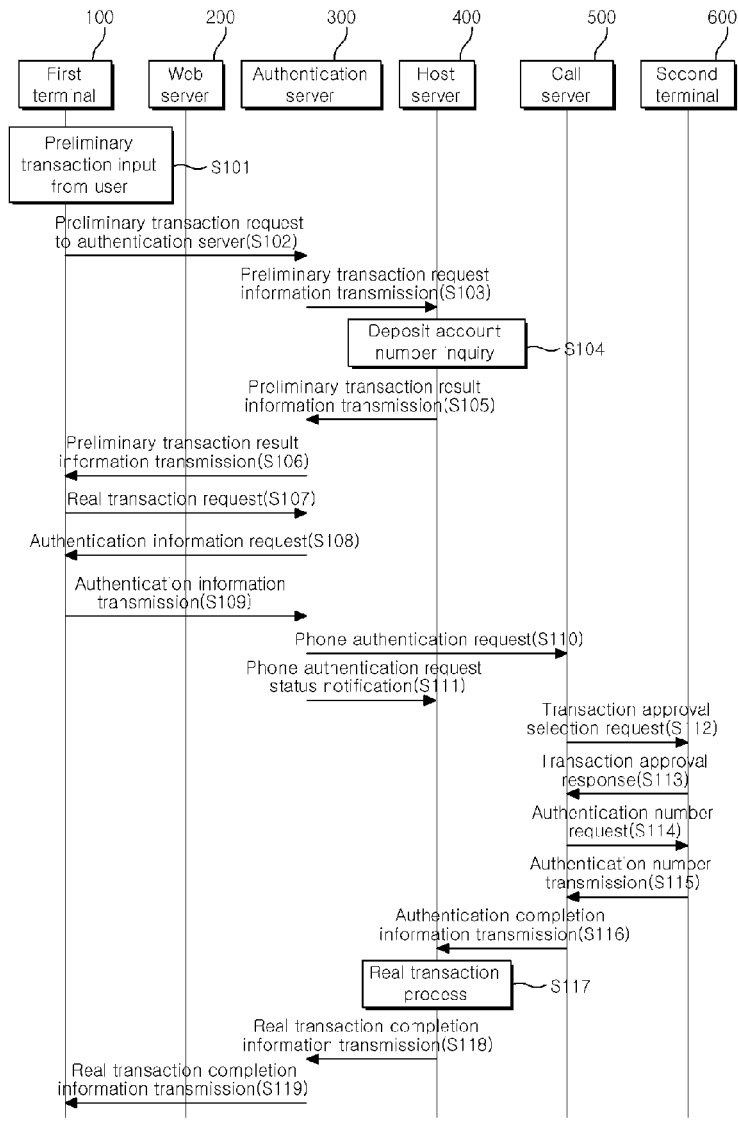
[Fig. 2]

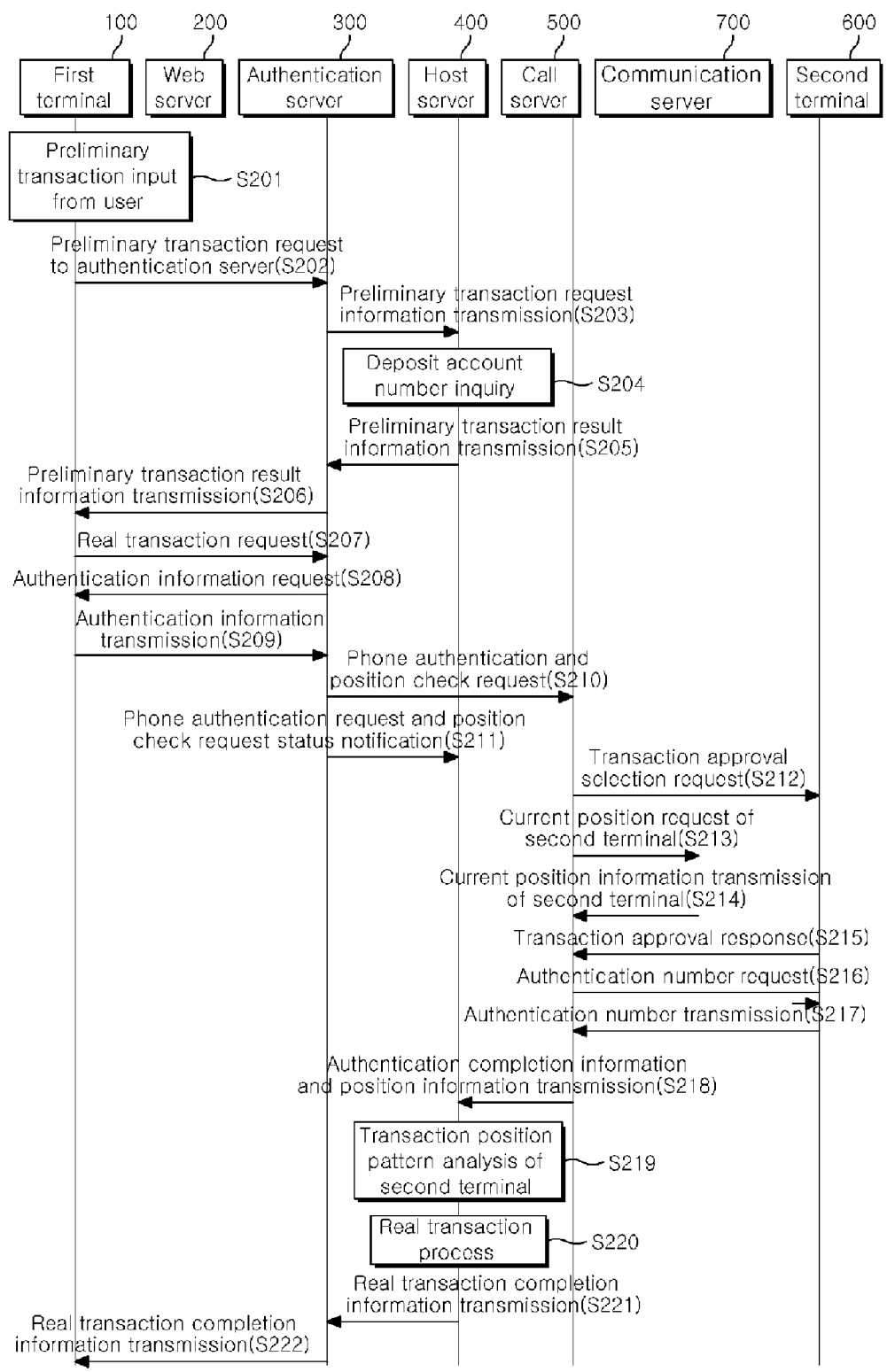
[Fig. 3]

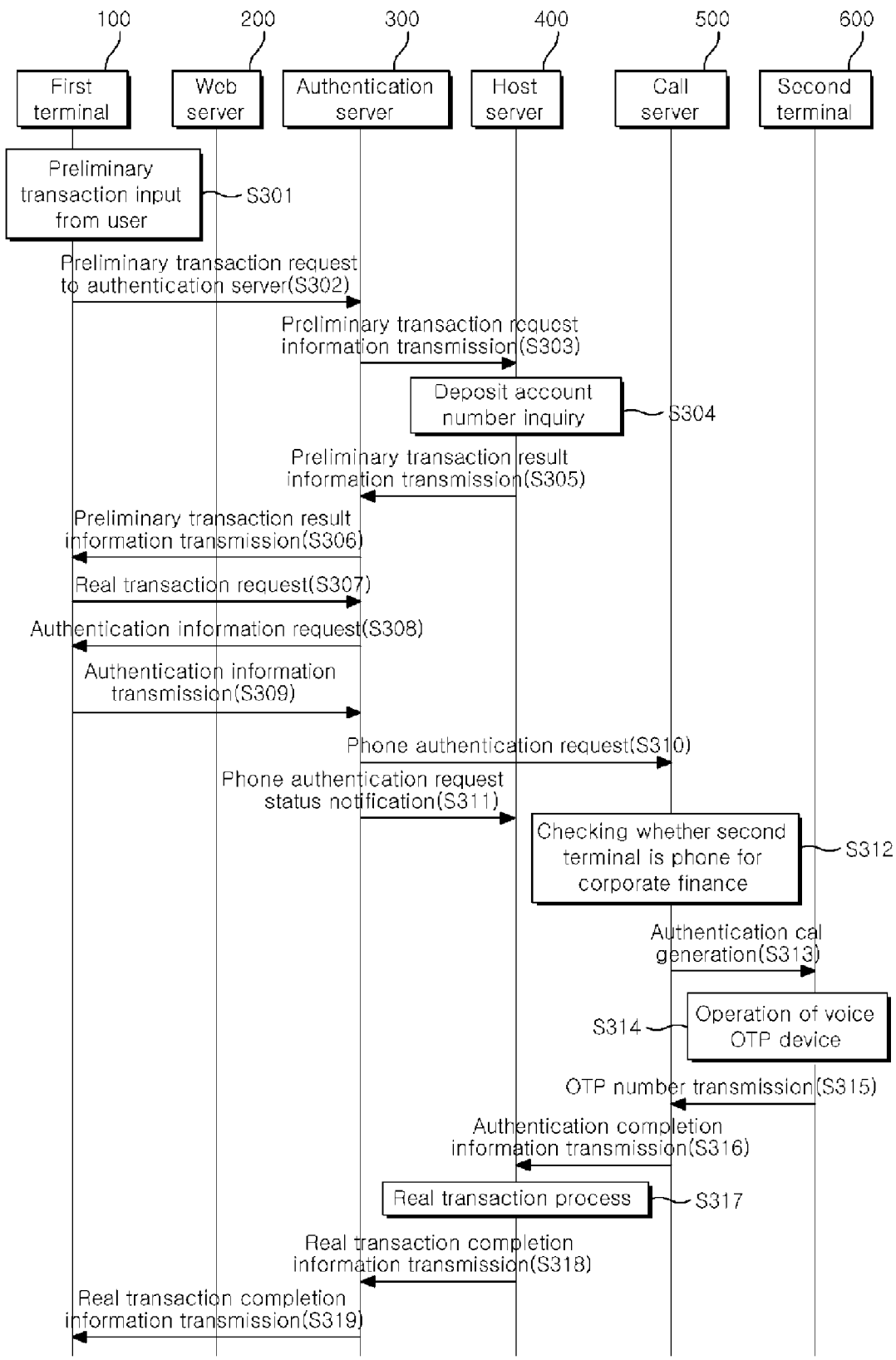

[Fig. 5]
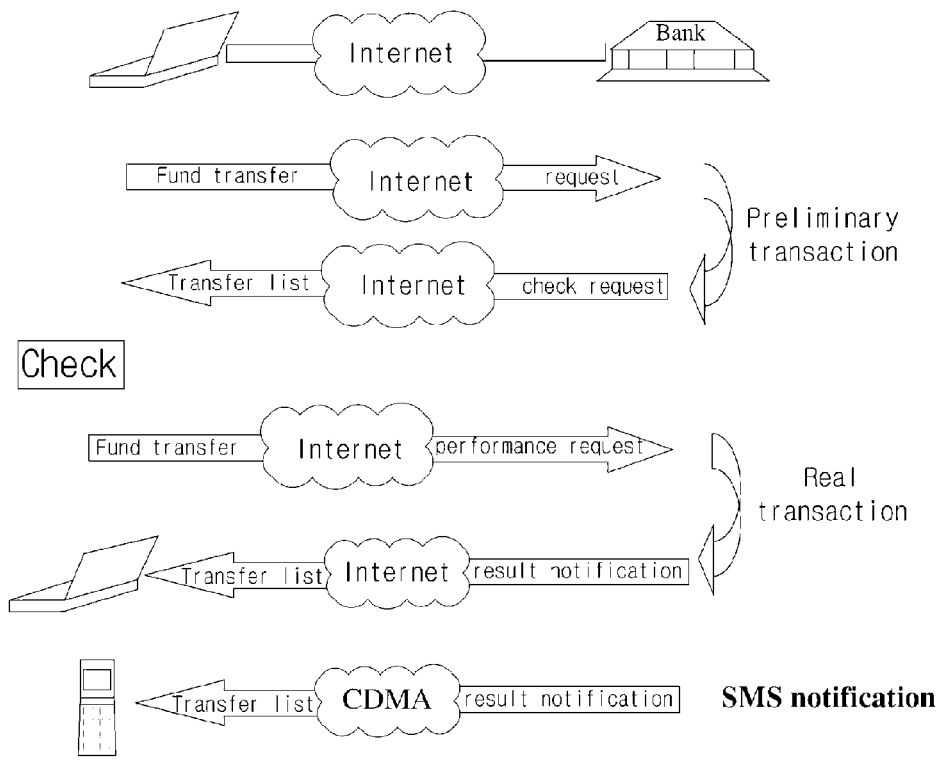
[Fig. 6]
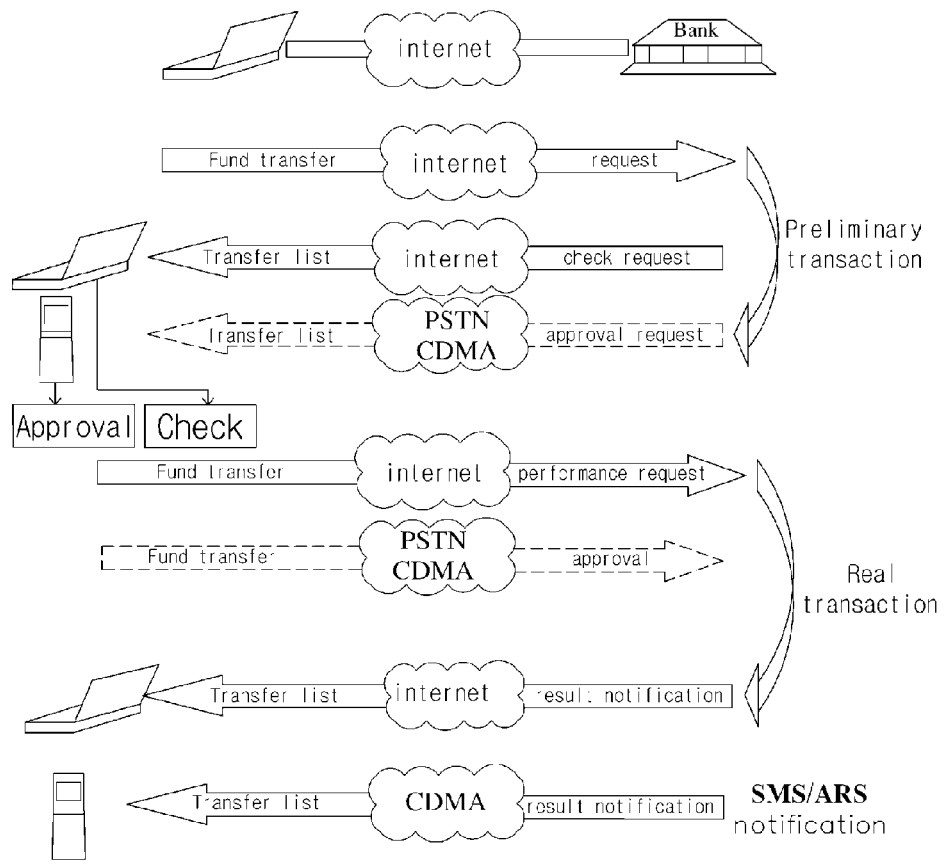

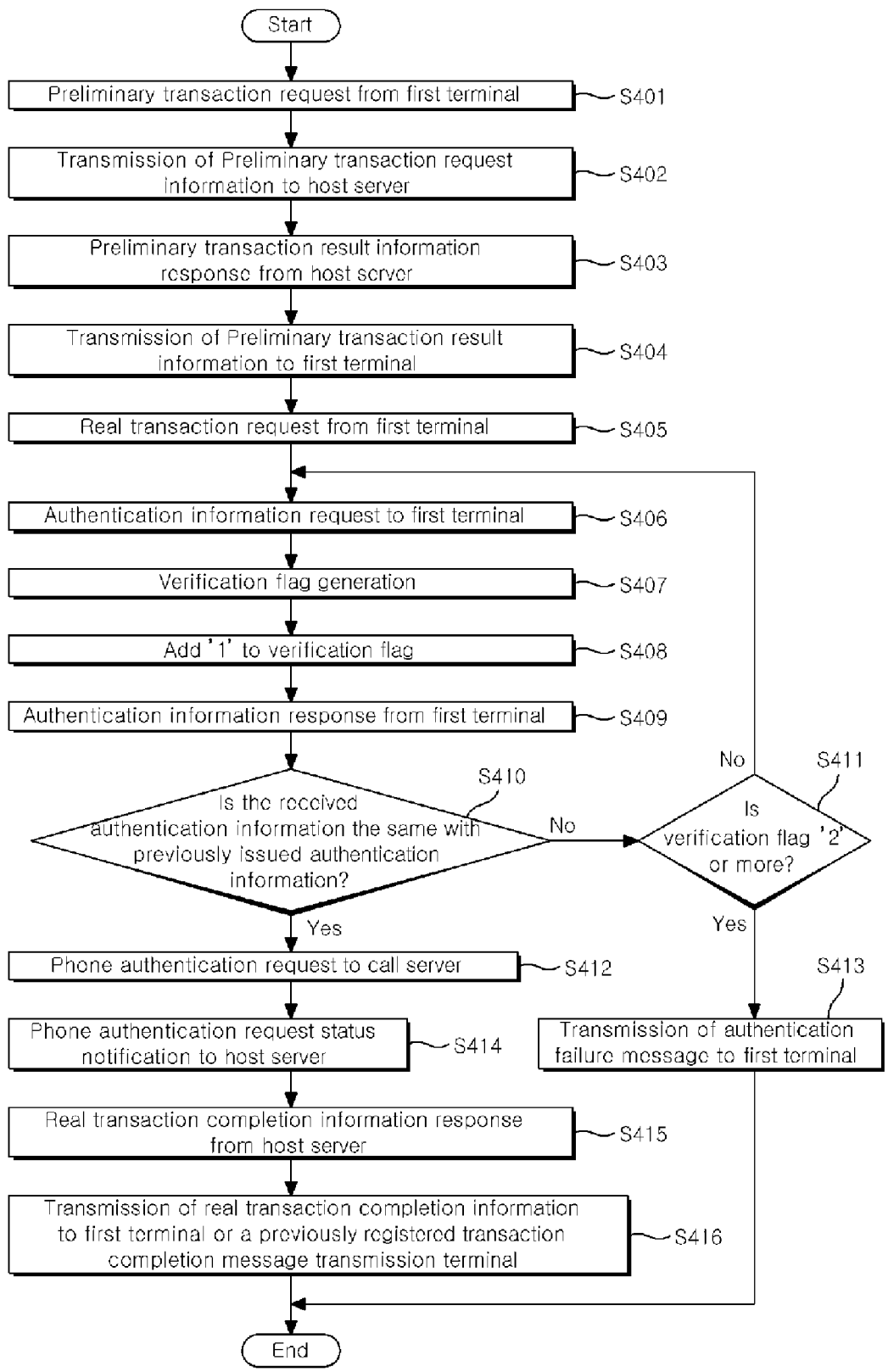
[Fig. 7]

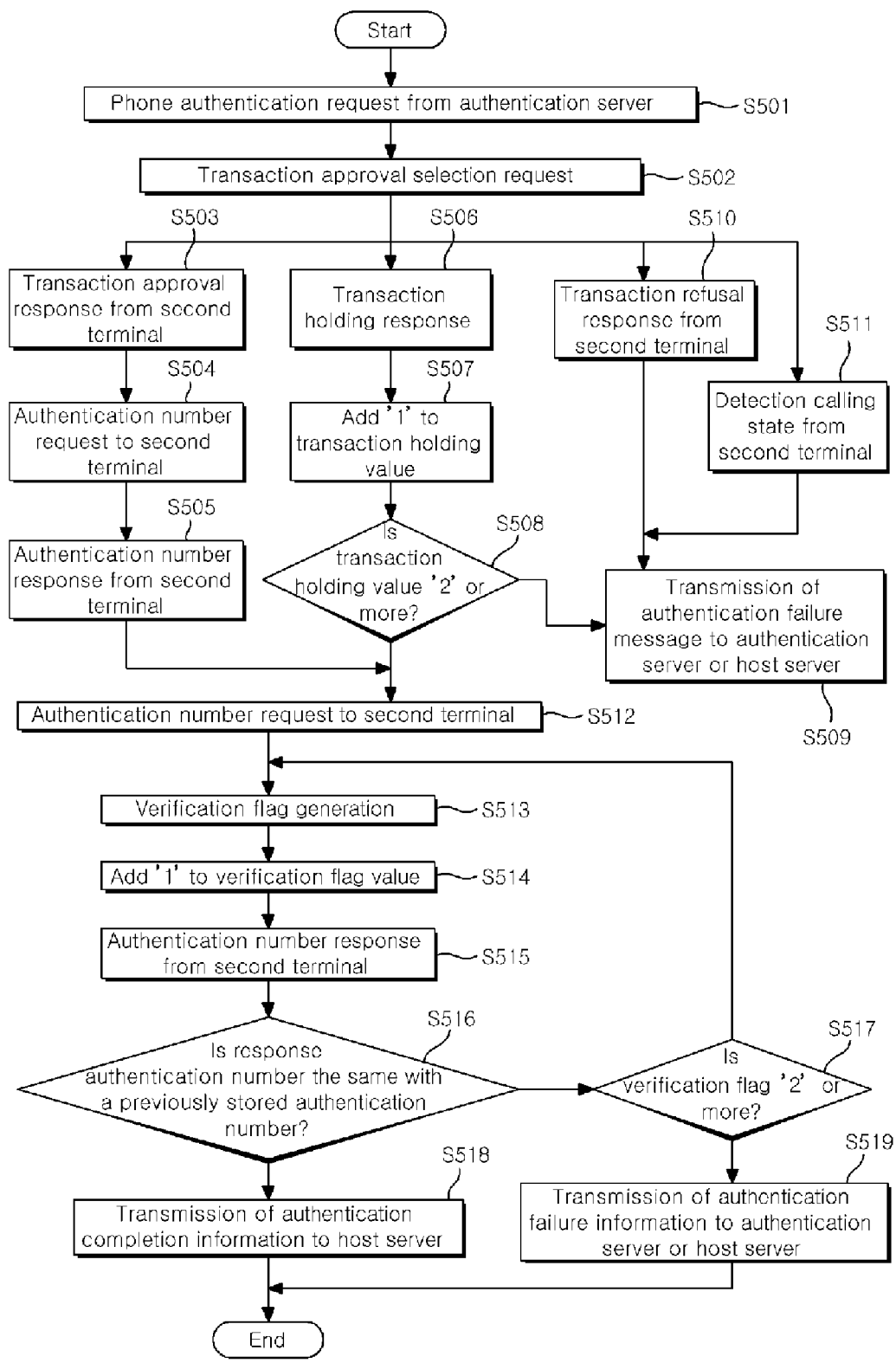
[Fig. 8]

[Fig. 9]
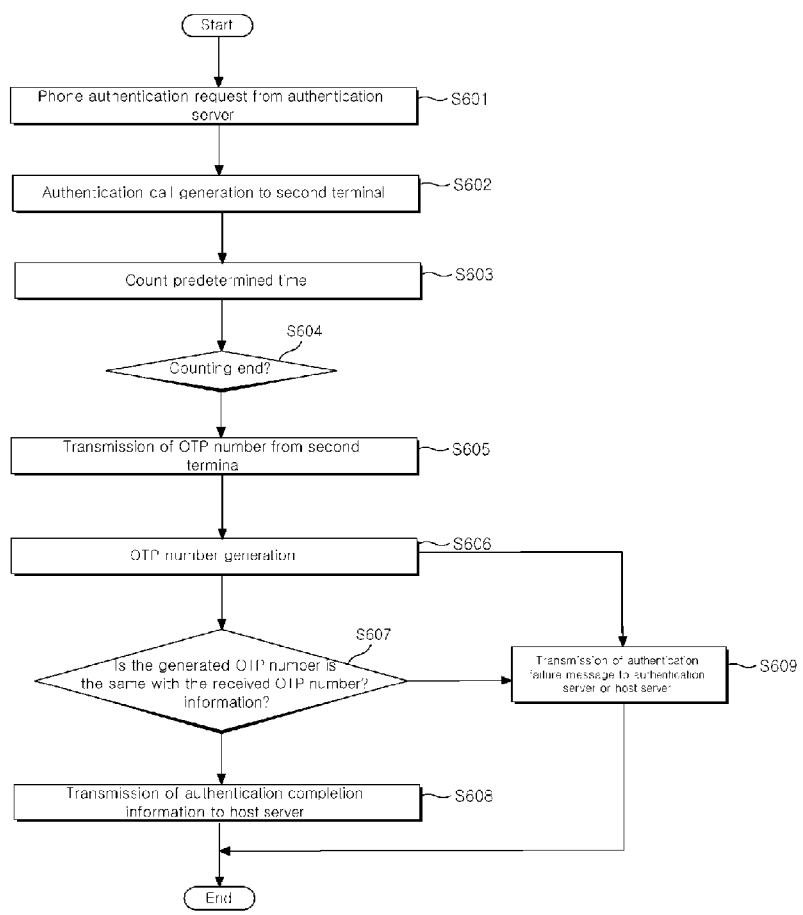
[Fig. 10]
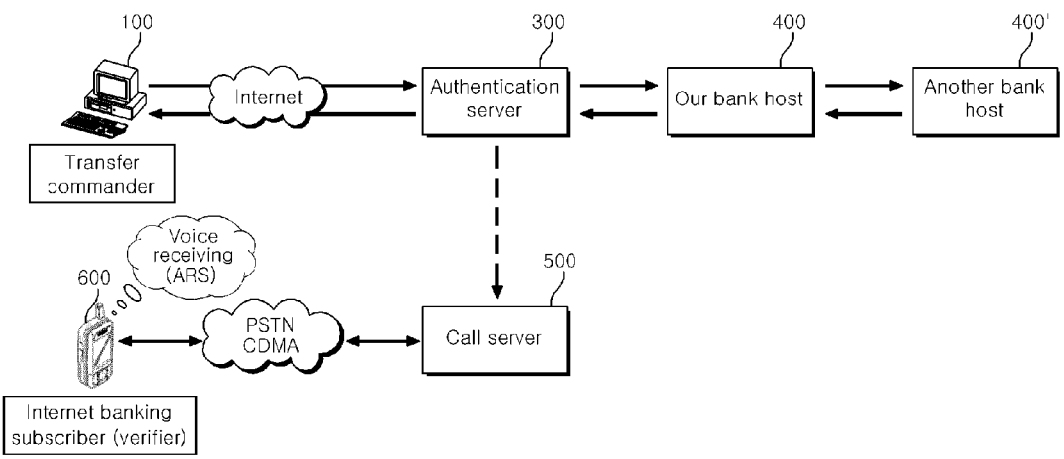

[Fig. 11]
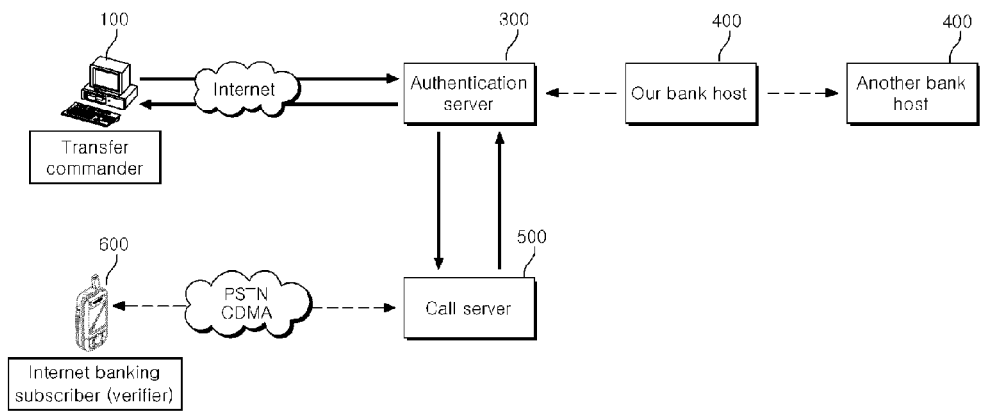
[Fig. 12]
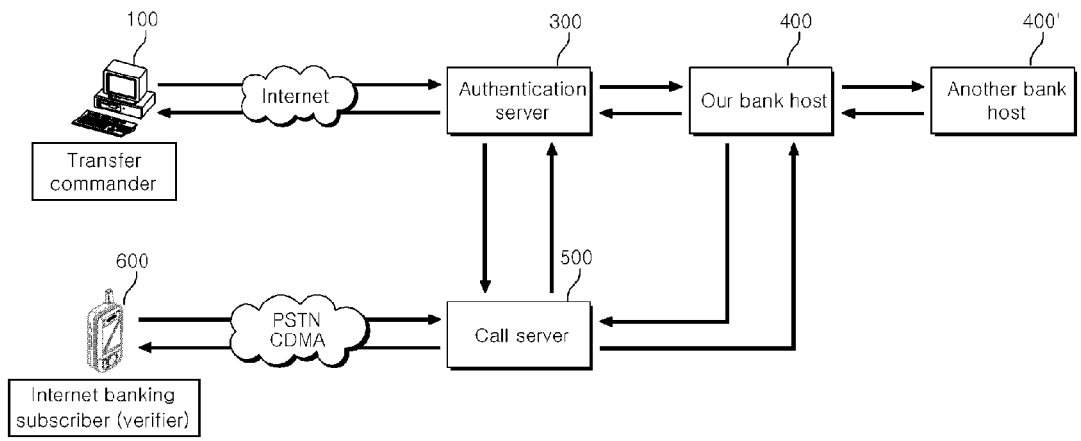
[Fig. 13]
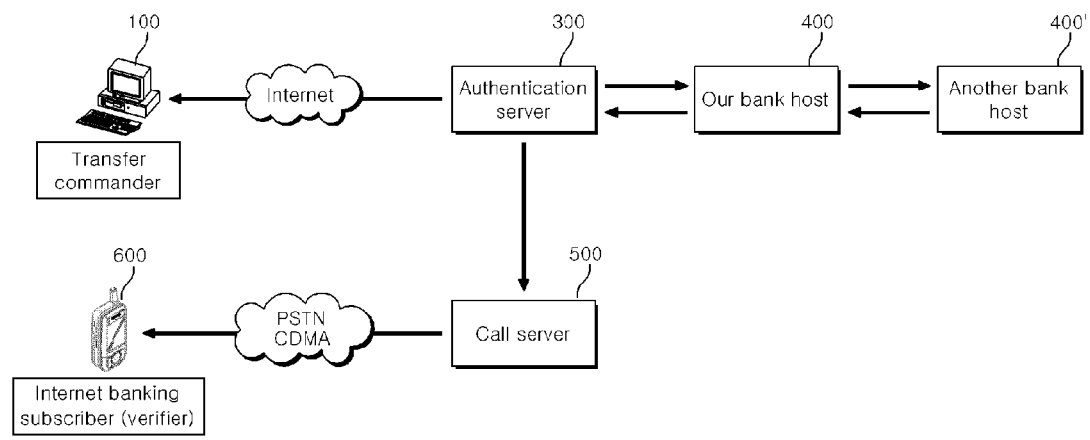

| http://pg.dacom.net:7080-:::Account transfer:::: | _ □ X |

| Account transfer | Bank selection >> Information input >> Transfer transaction >> Payment completion |

- Link test  Dual encryption operation

Product name : Test product
Purchaser name : Hong, Gil-Dong
Amount of money : 1,000 Won ■ Payment bank selection    Bank selection(service time)▼

[Certificate applied money classified by banks]
Whole amount of money : Kookmin,Kiup,Pusan,Taegu,Sanup,Shinhan,Oehwan,
                        Woori,Hana
One hundred thousand won : Kyongnam,Kwangju,Nonghyup,Saemaul,Suhyup,
                           Shinhyup,City,Post office,Jeonbuk,Jeil,
                           Cheju
Reference in payment error : Dacom ☎ 1544-7772(number 4)

Payment list notification e-mail(selection) [        ]
Phone number(selection)                    [010▼] [  ]-[  ]

■ Next   ■ Cancel

◎ LG Dacom                              ■ Money receipt franchise

●                          ● Internet

[Fig. 19]

```
http://pg.dacom.net:7080-:::Account transfer::::          _ ▢ X

┌─────────┐  Bank       Information   Transfer    Payment
│ Account │  selection>> input     >>transaction>>completion
│ transfer│
└─────────┘
- Link test                    Dual encryption operation  ▒

┌─────────────────────────────────────────────────┐
  │ Product name : Test product                     │
  │ Purchaser name : Hong, Gil-Dong                 │
  │ Amount of money : 1,000 Won                     │
  └─────────────────────────────────────────────────┘

■ Payment bank selection        [Kookmin(00:30~23:30) ▼]

┌─────────────────────────────────────────────────┐
  │ Service time 00:30~23:30                        │
  │ Transaction limitation per once                 │
  │    : 10,000,000 Won (Corporation account impossible) │
  │ Certificate requested(Whole transaction)        │
  │ Kookmin bank homepage(reference)                │
  │                                                 │
  └─────────────────────────────────────────────────┘

Payment list notification e-mail(selection) [test@test.com]
  Phone number(selection)            [010▼] [1111]-[2222]

[■ Next]  [■ Cancel]

◎ LG Dacom                         ■ Money receipt franchise

●                             ● Internet
```

[Fig. 20]

```
http://pg.dacom.net:7080-:::Account transfer::::          _ ▫ X
```

| Account transfer | Bank selection >> | Information input >> | Transfer transaction >> | Payment completion |

- Link test                    Dual encryption operation

| Account number | ⬚ | (Corporation impossible) |
| Pin number | ⬚ | (Number 4 place) |
| Deposit owner | ⬚ | (No space) |
| Resident registration number | ⬚ | (Business registration number impossible) |

■ Kookmin bank service guide

Authentication number : [123456]
Phone number : [01011112222]
Position information is stored for a safe transaction of a client.
( )Agreement       ( ) No agreement ■ Bank change    ■ Payment performance    ■ Cancel ◎ LG Dacom                              ■ Money receipt franchise ●                     ● Internet

[Fig. 21]

```
http://pg.dacom.net:7080-::::Account transfer::::          _ □ X

┌─────────┐ Bank      >> Information >> Transfer    >> Payment
│ Account │ selection    input         transaction    completion
│ transfer│
└─────────┘
 - Link test                    Dual encryption operation  ▓▓

Account number       1111111111      (Corporation impossible)
  Pin number           ●●●●            (Number 4 place)
  Deposit owner        Hong, Gil-Dong  (No space)
  Resident             111111111111    (Business registration
  registration number                   number impossible)

■ Kookmin bank service guide

Service time 00:30~23:30
    Transaction limitation per once
       : 10,000,000 Won (Corporation account impossible)
    Certificate requested(Whole transaction)
    Kookmin bank homepage(reference)

■ Bank change      ■ Payment performance    ■ Cancel

◎ LG Dacom                              ■ Money receipt franchise

●                                              ● Internet
```

[Fig. 22]

Search period : [YYYYMMDD]~[YYYYMMDD]
Phone number : [            ]
Bank : [            ]
Account number : [            ]
Deposit owner : [            ]

| Transaction date | Transaction time | Product name | Purchaser name | Amount of money | e-mail | Phone number | Bank | Account number | Deposit owner | Resident registration number | Authentication number | receiving location | Approval result |
|---|---|---|---|---|---|---|---|---|---|---|---|---|---|
| | | | | | | | | | | | | | |
| | | | | | | | | | | | | | |
| | | | | | | | | | | | | | |

PRELIMINARY VERIFICATION SYSTEM WHICH HAS A AUTHENTICATION BY PHONE ON THE INTERNET ENVIRONMENT

TECHNICAL FIELD

The present invention relates to a preliminary verification system under an Internet environment using a phone authentication service; and, more particularly, to a preliminary verification system under an Internet environment using a phone authentication service, which guarantees safety and integrity of authentication in case that a system enables an authenticated user to access to an electronic financial transaction such as Internet banking or various documents issued to the authenticated user.

BACKGROUND ART

Recently, various Internet accidents have increased by a rapid development of Internet. Accordingly, a secure countermeasure is requested for the Internet and main resources to prevent these Internet accidents.

In general, an authentication service using a secure card and a certificate has been used in the secure countermeasure.

However, when this authentication service is used in Internet banking or electronic commerce, the Internet banking or electronic commerce is exposed to a danger of a financial accident by blocking the hacking perfectly due to a keyboard hacking program.

Moreover, in a view of a safety, a short message service (SMS) used in a conventional Internet banking service have problems that the SMS does not have a preliminary prevention function for a financial transaction accident, and the SMS is weak for an attack from an external part, transmits contents which deceives a user by a disguised calling subscriber number, and leaks private information to a receiver by providing information of another user.

And, in a view of stability, there is no countermeasure for backup when a transfer transaction result notification is not received. A receiving check is not correct in the SMS, and a bank manages a non-receiving list through a self-management or a management agency. In case of large transmission traffic, there are many non-processed transfer transactions. Countermeasures are requested according to an occurrence of an overload caused by a mass character transmission. There is a gap between a transfer time point and a receiving time point in a banking service since there is a case that a mobile phone having a limited function may not receive a message.

Further, in view of society, a user petition may be occurred since a message transmission function of the mobile phone may be misused as spam information. Since the mobile phone has a limited SMS function, there is limitation for a medium. There are problems that a receiving is impossible in case of a lack of a battery, a process cost of the SMS is high in a view of economy, and re-transmission and a management cost are wasted in case of not receiving a message.

Moreover, as mentioned above, general secure countermeasure using the authentication service is limitedly applied to the use except the Internet banking and an electronic transaction since private information of a user is previously registered.

On the other hand, a conventional Internet banking may be applied to a large and small amount of money due to a strong authentication function, but since a payment gateway has a weak authentication function, the payment gateway is applied to a small amount of money payment. Accordingly, a stronger authentication device is needed.

An authentication device using an Internet Protocol (IP) trace has been proposed, but the authentication device using this IP trace has not been reliable authentication device due to a bypass problem of the IP.

DISCLOSURE OF INVENTION

Technical Problem

It is, therefore, an object of the present invention is provide to a preliminary verification system under an Internet environment using a phone authentication service, which improves integrity of authentication and electronic commerce in view of security.

Technical Solution

In accordance with an embodiment of the present invention, there is provided a preliminary verification system under an Internet environment using a phone authentication service, including: a first terminal connected to the Internet; a web server for interfacing the first terminal to be accessible for a site which needs a transaction access for authentication; an authentication server for performing the authentication for an electronic transaction requested from the first terminal via the web server; a host server connected to the authentication server for processing the electronic transaction requested from the first terminal; and a call server implemented by a computer and telephony integration (CTI) and an advanced record system (ARS) which are called through telephone network for accessing to a second terminal of a user of the first terminal which the electronic transaction is requested, receiving approval of the electronic transaction, receiving and verifying an authentication number according to the approval of the electronic transaction, and performing a phone authentication which provides authentication completion information according to the verification to the host server, wherein the host server performs the electronic transaction process according to the authentication completion information provided from the call server.

The authentication server is an Internet banking server or a verification server.

The host server is at least one of a financial agency server, a government and public offices server, an educational matters server, a medical information management server, and an administration information management server.

The authentication server requests a phone authentication of the second terminal to the call server and transmits a phone authentication request status to the host server according to the phone authentication request if the user authentication of the first terminal is completed.

The second terminal is called from the call server through a mobile wireless communication network (MWCN) or a public switched telephone network (PSTN), and is registered by the use which is previously contracted with a phone number service providing agency.

The call server checks position information of the second terminal through a communication server, and further provides the position information to the host server.

The host server performs the electronic transaction process in case that the host server exists on an approval position after analyzing a transaction position pattern from the position information of the second terminal provided from the call server.

The second terminal has a one time password (OTP) device which automatically generates and transmits an OTP number in case of a phone for a corporate banking.

The call server generates an authentication call which requests an OTP number to the second terminal, receives the OTP number corresponding to the generated authentication call from the second terminal, and generates an OTP number by the same scheme with an OTP device if it is determined that the second terminal includes a phone number for the corporate banking, and wherein the call server transmits the authentication completion information to the host server if the generated OTP number is the same with the received OTP number.

In accordance with another embodiment of the present invention, there is provided a preliminary verification system under an Internet environment using a phone authentication service, including: a first terminal connected to the Internet; a web server for interfacing the first terminal to be accessible for a site which needs a transaction access for authentication; an authentication server for performing the authentication for an electronic transaction requested from the first terminal via the web server; a host server connected to the authentication server for processing the electronic transaction requested from the first terminal; and a call server implemented by a computer and telephony integration (CTI) and an advanced record system (ARS) which are called through telephone network for accessing to a second terminal of a user of the first terminal which the electronic transaction is requested, receiving approval of the electronic transaction, receiving and verifying an authentication number according to the approval of the electronic transaction, acquiring position information of the second terminal through a communication server, and providing the acquired position information and authentication completion information according to the verification to the host server, wherein the host server, after analyzing a transaction position pattern from the position information of the second terminal, performs the electronic transaction process if it is determined that the second terminal exists on an approval position.

In accordance with another embodiment of the present invention, there is provided a preliminary verification system under an Internet environment using a phone authentication service, including: a first terminal connected to the Internet; a second terminal having a one time password (OTP) device which automatically generates and transmits an OTP number; a web server for interfacing the first terminal to be accessible for a site which needs a transaction access for authentication; an authentication server for performing the authentication for an electronic transaction requested from the first terminal via the web server; a host server connected to the authentication server for processing the electronic transaction requested from the first terminal; and a call server implemented by a computer and telephony integration (CTI) and an advanced record system (ARS) which are called through telephone network for generating an authentication call to a second terminal of a user of the first terminal which the electronic transaction is requested, receiving an OTP number corresponding to the authentication call from the second terminal, generating an OTP number by the same scheme with an OTP device, transmitting authentication completion information to the host server if the generated OTP number is the same with the received OTP number, wherein the host server performs the electronic transaction process according to the authentication completion information received from the call server.

In accordance with another embodiment of the present invention, there is provided a preliminary verification method under an Internet environment using a phone authentication service in a system including a first terminal, a web server, an authentication server, a host server, a call server and a second terminal, the method including the steps of: providing a preliminary transaction request generated from the first terminal to the authentication server through the web server; at the authentication server, transmitting the preliminary transaction request information to the host server, and providing preliminary transaction result information corresponding to the preliminary transaction request information from the host server to the first terminal; at the authentication server, in case of receiving a real transaction request generated from the first terminal, receiving and verifying the authentication information from the first terminal according to the electronic transaction approval, and requesting a phone authentication for the second terminal of the user of the authenticated first terminal to the call server; at the call server, receiving approval of the transaction from the second terminal, receiving and verifying an authentication number according to the approval, and providing the authentication completion information to the host server according to the verification; and at the host server, performing the electronic transaction process according to the authentication completion information received from the call server.

It is preferred that the authentication server informs the phone authentication request status of the host server according to the phone authentication request after requesting the phone authentication for the second terminal to the call server.

It is preferred that the preliminary verification method under an Internet environment using a phone authentication service further includes the steps of: at the authentication server, requesting position information for the second terminal to the call server; at the call server, checking position information of the second terminal through a communication server and providing the position information to the host server; and at the host server, after analyzing a transaction position pattern from the position information of the second terminal provided from the call server, performing the electronic transaction process in case that the transaction position pattern exists on an approval position.

It is preferred that the preliminary verification method under an Internet environment using a phone authentication service includes the steps of: at the call server, generating an authentication call to the second terminal which requests a one time password (OTP) number in case that the second terminal includes a phone number for a corporate banking; at the call server, receiving the OTP number corresponding to the authentication call from the second terminal; and at the call server, generating an OTP number by the same scheme with an OTP device, and transmitting the authentication completion information to the host server if the generated OTP number is the same with the received OTP number.

In accordance with another embodiment of the present invention, there is provided a preliminary verification method under an Internet environment using a phone authentication service in a system including a first terminal, a web server, an authentication server, a host server, a call server and a second terminal, the method including the steps of: providing a preliminary transaction request generated from the first terminal to the authentication server through the web server; at the authentication server, transmitting the preliminary transaction request information to the host server, and providing preliminary transaction result information corresponding to the preliminary transaction request information from the host server to the first terminal; at the authentication server, in case of receiving a real transaction request generated from the first terminal, receiving and verifying the authentication information from the first terminal according to the electronic transaction approval, and requesting a phone authentication for the second terminal of the user of the authenticated first terminal to the call server; at the call server, receiving approval of the transaction from the second terminal, receiving and verifying an authentication number according to the approval, acquiring the position information of the second terminal from a communication server, and providing the acquired position information and authentication completion information according to the verification to the host server; and at the host server, after analyzing a transaction position pattern which is provided from the authentication completion information and the position information of the second terminal, if it is determined that the second terminal exists on an approval position, performing the electronic transaction process.

In accordance with another embodiment of the present invention, there is provided a preliminary verification method under an Internet environment using a phone authentication service in a system including a first terminal, a web server, an authentication server, a host server, a call server and a second terminal, the method including the steps of: providing a preliminary transaction request generated from the first terminal to the authentication server through the web server; at the authentication server, transmitting the preliminary transaction request information to the host server, and providing preliminary transaction result information corresponding to the preliminary transaction request information from the host server to the first terminal; at the authentication server, in case of receiving a real transaction request generated from the first terminal, receiving and verifying the authentication information from the first terminal according to the electronic transaction approval, and requesting a phone authentication for the second terminal of the user of the authenticated first terminal to the call server; at the call server, generating an authentication call to the second terminal, receiving a one time password (OTP) number corresponding to the authentication call from the second terminal, generating an OTP number by the same number of an OTP device, and transmitting authentication completion information to the host server if the generated OTP number is the same with the received OTP number; and at the host server, performing the electronic transaction process according to the authentication completion information received from the call server.

BRIEF DESCRIPTION OF THE DRAWINGS

FIG. 1 is a block diagram illustrating a preliminary verification system under an Internet environment using a phone authentication service in accordance with an embodiment of the present invention;

FIG. 2 is a flowchart illustrating a preliminary verification method under an Internet environment using a phone authentication service in accordance with an embodiment of the present invention;

FIG. 3 is a flowchart illustrating a preliminary verification method under an Internet environment using a phone authentication service in accordance with another embodiment of the present invention;

FIG. 4 is a flowchart illustrating a preliminary verification method under an Internet environment using a phone authentication service in accordance with another embodiment of the present invention;

FIG. 5 is a block diagram illustrating a method for post-informing a transaction list through an SMS in accordance with a conventional technology;

FIG. 6 is a block diagram illustrating a preliminary verification method under an Internet environment using a phone authentication service in accordance with an embodiment of the present invention;

FIG. 7 is a flow chart illustrating an operation of an authentication server in accordance with an embodiment of the present invention;

FIG. 8 is a flow chart illustrating an operation of a call server in accordance with an embodiment of the present invention;

FIG. 9 is a flow chart illustrating an operation of a call server in accordance with another embodiment of the present invention;

FIG. 10 is a block diagram illustrating a preliminary transaction flow in a preliminary verification system under an Internet environment using a phone authentication service in accordance with an embodiment of the present invention;

FIG. 11 is a block diagram illustrating a real transaction flow in a preliminary verification system under an Internet environment using a phone authentication service in accordance with an embodiment of the present invention;

FIG. 12 is a block diagram illustrating a real approval flow in a preliminary verification system under an Internet environment using a phone authentication service in accordance with an embodiment of the present invention;

FIG. 13 is a block diagram illustrating a real transaction result notification flow in a preliminary verification system under an Internet environment using a phone authentication service in accordance with an embodiment of the present invention;

FIGS. 14 to 17 are diagrams illustrating preliminary transaction request screens of an implemented GUI display in accordance with an embodiment of the present invention;

FIGS. 18 to 21 are diagrams illustrating preliminary transaction request screens of an implemented GUI display in accordance with another embodiment of the present invention; and FIG. 22 is a block diagram illustrating a user database of a host server in accordance with an embodiment of the present invention.

BEST MODE FOR CARRYING OUT THE INVENTION

FIG. 1 is a block diagram illustrating a preliminary verification system under an Internet environment using a phone authentication service in accordance with an embodiment of the present invention.

As shown in FIG. 1, a preliminary verification system under an Internet environment using a phone authentication service includes a first terminal 100, a web server 200, an authentication server 300, a host server 400, a call server 500 and a second terminal 600.

In the system having this configuration, the first terminal 100 as a user terminal is capable of being connected to the Internet, and includes a personal computer (PC), a notebook, a personal digital assistant (PDA) and an international protocol television (IPTV). The web server 200 performs an interfacing function which enables the first terminal to be accessible to an electronic transaction site requested from the first terminal 100, that is, a credibility transaction site, various certificate providing sites of government and public offices, or a site which needs a transaction access for authentication.

The authentication server 300 performs the authentication for an electronic transaction requested from the first terminal 100 and is Internet banking as a representative example.

The host server 400 connected to the authentication server 300, processes the electronic transaction requested from the first terminal 100, and may be classified into a financial agency server and a government and public offices server according to a sort of the electronic transaction. That is, the host server 400 may be a server of a financial agency for a general financial transaction or a server of an agency which manages personal affairs/carrier information such as educational matters information, medical information and administration information.

The call server 500 is implemented by a computer and telephony integration (CTI) authentication and an advanced record system (ARS) authentication which are called through telephone network, and accesses to the second terminal 600 corresponding to user information of the first terminal which the electronic transaction is requested. The call server 500 receives approval of the electronic transaction, receives and verifies an authentication number according to the approval.

And, the call server 500 traces and provides a position of the second terminal 600 to the host server 400.

The second terminal 600 is called from a call server 500 through a mobile wireless communication network (MWCN) or a public switched telephone network (PSTN), and is corresponding to a number which is registered when a user, who requests the use of service of the present invention, previously contracts with the service providing agency on off-line.

Next, an operation of system which performs a preliminary verification method under an Internet environment using a phone authentication service having this configuration will be described in detail.

FIG. 2 is a flowchart illustrating a preliminary verification method under an Internet environment using a phone authentication service in accordance with an embodiment of the present invention.

Referring to FIG. 2, the first terminal 100 connected to the Internet is access to a web site of a financial agency which a transaction is wanted through the web server 200 and requests a preliminary transaction based on the preliminary transaction information inputted from the user at steps S101 and S102.

Here, the web server 200 performs an interface function between the first terminal 100 and the authentication server 300. Hereinafter, since the web server 200 is identically applied to a communication between the first terminal 100 and the authentication server 300, an art related with the web server will be omitted.

Next, if a preliminary transaction is requested from the first terminal 100, the authentication server 300 transmits corresponding preliminary transaction request information to the host server 400 at step S103, and after the host server 400 inquires a deposit account number from the transmitted preliminary transaction request information at step S104, the host server 400 transmits the preliminary transaction result information including user information corresponding to the inquired deposit account number to the authentication server 300 at step S105.

The authentication server 300 re-transmits the preliminary transaction result information transmitted from the host server 400 to the first terminal 100 at step S106 and receives a real transaction request, which is generated by a user who checks the preliminary transaction result information, from the first terminal at step S107.

If the real transaction is requested from the first terminal 100, the authentication server 300 requests authentication information for user authentication to the first terminal 100 at step S108 and receives the authentication information, which inputted by the user, from the first terminal at step S109. Here, the authentication information is a password of an authentication means which is issued by the authentication server 300 and may be a password of a certificate representatively.

If the authentication information provided from the first terminal 100 is the same with the authentication information which is previously issued, the authentication server 300 requests the phone authentication to the call server 500 at step S110 and informs the corresponding phone authentication request status of the host server 400 at step S111.

If phone authentication is requested from the authentication server 300, the call server 500 requests an approval selection of the transaction to the second terminal 600 which is registered when the user corresponding to the first terminal 100 previously contracts the use of the phone authentication service with a service providing agency on off-line at step S112.

That is, the call server 500 enables the second terminal 600 to select the approval, refusal or holding of the transaction. In case that the approval of the transaction is selected at step S113, the call server 500 requests the authentication number for the user authentication at step S114.

However, in case that a user of the second terminal 600 selects the holding of the transaction, the call server 500 informs the authentication result failure information of the host server 400 if the number of re-requests are two or more, and the call server 500 re-requests the phone approval selection after holding for a predetermined time if the number of the re-requests are less than two. Moreover, in case that the second terminal 600 is busy state, the call server 500 informs the authentication result failure information of the host server 400 if the number of re-requests are two or more, and the call server 500 requests the phone approval selection after holding for a predetermined time if the number of re-requests are less than two.

However, the second terminal 600 receives the request of the authentication number from the call server 500 transmits the authentication number inputted from the user to the call server 500 at step 115. The call server 500 compares the transmitted authentication number with the authentication stored to be corresponding to the second terminal 600, and transmits the authentication completion information for the second terminal 600 to the host server 400 at step S116.

From this, after processing real transaction at step S117, the host server 400 transmits the processed real transaction completion information to the authentication server 300 at step S118. The authentication server 300 re-transmits the transmitted real transaction completion information to the first terminal 100 or the previously registered transaction completion message transmission terminal at step S119.

FIG. 3 is a flowchart illustrating a preliminary verification method under an Internet environment using a phone authentication service in accordance with another embodiment of the present invention.

Referring to FIG. 3, the first terminal 100 connected to the Internet is access to a web site of a financial agency which a transaction is wanted through the web server 200 and requests a preliminary transaction based on the preliminary transaction information inputted from the user at steps S201 and S202.

Next, if a preliminary transaction is requested from the first terminal 100, the authentication server 300 transmits corresponding preliminary transaction request information to the host server 400 at step S203, and after the host server 400 inquires a deposit account number from the transmitted preliminary transaction request information at step S204, the host server 400 transmits the preliminary transaction result information including user information corresponding to the inquired deposit account number to the authentication server 300 at step S205.

The authentication server 300 re-transmits the preliminary transaction result information transmitted from the host server 400 to the first terminal 100 at step S206 and receives a real transaction request, which is generated by a user who checks the preliminary transaction result information, from the first terminal at step S207.

If the real transaction is requested from the first terminal 100, the authentication server 300 requests authentication information for user authentication to the first terminal 100 at step S208 and receives the authentication information, which inputted by the user, from the first terminal at step S209.

If the authentication information provided from the first terminal 100 is the same with the authentication information which is previously issued, the authentication server 300 requests the phone authentication and a position check to the call server 500 at step S210 and informs the corresponding phone authentication and position check request status of the host server 400 at step S211.

If the phone authentication and position check are requested from the authentication server 300, the call server 500 requests the approval selection of the transaction via a communication server, which is accessed through a mobile wireless communication network (MWCN) or a public switched telephone network (PSTN), to the second terminal 600 of which phone number is registered when the user corresponding to the first terminal 100 previously contracts the use of the phone authentication service with a service providing agency on off-line at step S212.

The call server 500 requests the current position of the second terminal 600 to the communication server 700, and receives the position information of the corresponding second terminal 600 from the communication server 700 at step S214. The call server 500 receives the approval information corresponding to the transaction approval selection request from the second terminal 600 at step 215.

If the transaction approval is selected from the second terminal 600, the call server 500 requests the authentication number for the user authentication to the second terminal 600 at step S216. The second terminal 600 transmits the authentication number inputted from the user to the call server 500 at step S217.

Next, the call server 500 compares the transmitted authentication number with the authentication stored to be corresponding to the second terminal 600, and transmits the authentication completion information for the second terminal and the position information of the second terminal 600 to the host server 400 at step S218.

From this, the host server 400 analyzes a transaction position pattern of the second terminal based on the transmitted position information of the second terminal at step S219, and processes the real transaction according as the second terminal 600 exists on an approval position at step S220.

That is, in case that a user wants a financial transaction in Seoul at 1:00 p.m., and a financial re-transaction at 1:30 p.m., the host server 400 may reject the approval if the position of the user is out of range to be moved within 30 minutes by the current traffic means.

Moreover, in case that the user inputs a position range to the host server 400 and indicates the position range as an electronic financial transaction region, the user position is traced according to the approval information of the user, and the transaction approval is processed if the user exists within the indicated position range.

That is, the host server 400 determines the approval for the transaction request based on the approval information of the user and transaction trace pattern analysis data.

After processing the real transaction, the host server 400 transmits the processed real transaction completion information to the authentication server 300 at step S221. The authentication server 300 re-transmits the transmitted real transaction completion information to the first terminal 100 or the previously registered transaction completion message transmission terminal at step S222.

On the other hand, since there are no many transactions in personal finance, the authentication using the second terminal 600 illustrated in FIGS. 2 and 3 in every transaction may be used as a strong authentication means, but in case of corporate finance, e.g., transfer of the salary of hundreds of members, each authentication of the second terminal 600 may be cumbersome a lot.

Accordingly, the present invention enables an OTP device applicable to a general wire/wireless terminal and a mobile communication terminal to be coupled to the second terminal 600, and enables the second terminal 600 to be selectively connected to the OTP device according to the receiving of the authentication call generated from the call server 500.

That is, the second terminal 600 discriminates the authentication call from a general phone call, and automatically provides the authentication call to the call server 500 by recognizing the authentication call in case of the authentication call. In case that the authentication call is received from the call server 500 according to the authentication of the terminal, the second terminal 600 operates the OTP device and transmits the OTP number, which is automatically generated from the OTP device, to the call server 500. The second terminal 600 performs a phone function in case of receiving a general phone call.

Here, the OTP device may be a voice OTP which generates the OTP by a voice.

FIG. 4 is a flowchart illustrating a preliminary verification method under an Internet environment using a phone authentication service in accordance with another embodiment of the present invention.

Referred to FIG. 4, as shown in FIGS. 2 and 3 mentioned above, communications among the authentication server 300, the host server 400 and the first terminal which is access to the web server 200 where a transaction is requested are performed at steps S301 to S311.

According to this operation, if the phone authentication is requested from the authentication server 300, the call server 500 checks whether the second terminal, of which number is registered when the user corresponding to the first terminal 100 previously contracts the use with the service providing agency on off-line, is a phone number of the corporate finance. In case that the number of the second terminal is the phone number of the corporate finance at step S312 according to the checked result, the authentication call is generated in the second terminal 600 at step S313.

The second terminal 600 checks the received authentication call, operates the OTP device at step S314 and transmits the OTP number generated from the OTP device to the call server 500 at step S315.

Next, the call server 500 compares the OTP number transmitted from the second terminal 600 with the TOP number generated to be corresponding to the second terminal, and transmits the authentication completion information for the second terminal 600 to the host server 400 if the compared OTP numbers are the same with each other at step S316.

From this, after processing the real transaction at step S317, the host server 400 transmits the processed real transaction completion information to the authentication server 300 at step S318. The authentication server 300 re-transmits the transmitted real transaction completion information to the first terminal 100 or the previously registered transaction completion message transmission terminal at step S319

According to the operation illustrated in FIG. 4, if an account clerk try to perform the Internet banking in a corporate finance which separates an account manager and the account clerk, the authentication call is generated to the account manager, and final approval is performed by the OTP number generated in the OTP device installed on the second terminal 600 of the account manager.

FIG. 5 is a block diagram illustrating a method for post-informing a transaction list through an SMS in accordance with a conventional technology. The FIG. 5 is shown to be compared with the block diagram illustrating a preliminary verification method under an Internet environment using a phone authentication service in accordance with an embodiment of the present invention in the FIG. 6.

As shown in FIG. 5, in a conventional Internet banking, if a request of a fund transfer is received as a preliminary transaction by a client which is access to the Internet banking, a server requests a transfer list check. If the check is completed, a fund transfer of a real transaction is requested by the client, and if the transfer is complete, the transfer result is informed of the client or a phone number having a photograph through a short message service (SMS).

On the other hand, as shown in FIG. 6, the present invention informs the result of transfer or payment as well as preliminary approval. In a preliminary transaction, the sent invention further includes steps of informing a transfer request of a client through an MWCN or a PSTN and re-verifying the approval of the transfer by a phone receiver as a deposit owner. If the approval is performed by a receiver having an authority, this transaction is processed, and the transfer result is selectively or separately transmitted to a user of the Internet banking or a receiver who performs the authentication.

FIG. 7 is a flow chart illustrating an operation of an authentication server in accordance with an embodiment of the present invention.

Referred to FIG. 7, if the preliminary transaction is requested from the first terminal 100 at step S401, the authentication server 300 transmits preliminary transaction request information to the host server 400 at step S402 and receives the preliminary transaction result information corresponding to the preliminary transaction request information from the authentication server 300 at step S403.

And, the authentication server 300 re-transmits the preliminary transaction result information transmitted from the host server 400 to the fist terminal 100 at step S404 and receives a real transaction request inputted from the user, who checks the preliminary transaction result information, from the first terminal 100 at step S405.

If the real transaction is requested from the first terminal 100, after the authentication server 300 requests the authentication information for the user authentication to the first terminal 100 at step S406, the authentication server 300 generates a verification flag at step S407 and adds '1' to the generated verification flag value at step S408.

Next, if the authentication server 300 receives the authentication information inputted from the user from the first terminal 100 at step S409, the authentication server 300 compares the authentication information received from the first terminal 100 with the authentication information which is previously issued at step S410, and requests the phone authentication to the call server 500 if the compared authentication information are the same with each other at step S412.

However, if the compared authentication information are not the same with each other, the authentication server 300 checks the verification flag at step S411, re-requests the authentication information to the first terminal and verifies the authentication information received from the first terminal 100 if the verification flag value is less than two at steps S406 to S410.

Here, if the checked flag value is two ore more, after the authentication server 300 transmits an authentication failure message to the first terminal 100 at step S413, the authentication server 300 completes all operations.

After the authentication server 300 requests the phone authentication to the call server 500, the authentication server 300 informs the phone authentication request status to the host server 400 at step S414, receives the processed real transaction completion information from the host server 400 at step S415 and transmits the processed real transaction completion information to the first terminal 100 or the previously registered transaction completion message transmission terminal at step S416.

Meanwhile, according to another embodiment of the present invention, in case that the authentication information received from the first terminal 100 is the same with the authentication information which is previously issued, the authentication server 300 requests the phone authentication and position check to the call server at the step S410 and informs the phone authentication and position check request status to the host server 400 at the step 413.

FIG. 8 is a flow chart illustrating an operation of a call server in accordance with an embodiment of the present invention.

As shown in FIG. 8, if the call server 500 receives the phone authentication request from the authentication server 300 at step S501, the call server 500 requests the approval selection of an electronic transaction for a second terminal, which is registered when the user corresponding to the first terminal 100 contacts previously the use with the phone number service providing agency on off-line, which is requested by the first terminal via the communication server 700 connected through the MWCN or PSTN at step S502.

If the call server 500 receives a response of the electronic transaction approval at step S503, the call server 500 requests the authentication number for the user authentication to the second terminal at step S504, and receives the authentication number corresponding to the authentication number request from the second terminal 600 at step S505.

However, if a transaction holding is transmitted from the second terminal 600 in response to the requested electronic transaction approval selection at step S506, after the call server 500 adds '1' to a transaction holding value at step S507, the call server 500 re-requests the electronic transaction approval selection to the second terminal according to a predetermined period at step S502 if the added transaction holding value is less than a predetermined value, e.g., two at step S508.

Here, if the transaction holding is transmitted from the second terminal 600 in response to the re-requested electronic transaction approval selection at step S506, the call server 500 performs repeatedly the re-request step of the transaction holding value addition and the electronic transaction approval selection. If the transaction holding value is two or more at step S508, after the call server 500 transmits the authentication failure message to the authentication server 300 or the host server 400 at step S509, the call server 500 completes the authentication processes.

Moreover, in case that the transaction rejection is transmitted from the from the second terminal 600 in response to the requested electronic transaction approval selection at step S510, after the call server 500 transmits the authentication failure message to the authentication server 300 or the host server 400, the call server 500 completes the authentication processes.

Further, in case that a busy state of the second terminal 600 is detected in response to the requested electronic transaction approval selection at step S511, after the call server 500 transmits the authentication failure message to the authentication server 300 or the host server 400 at step S509, the call server 500 completes the authentication processes.

Next, after the call server 500 requests the authentication number to the second terminal 600 which the transaction is approved at step S512, the call server 500 generates the verification flag at step S513 and adds 1 to the generated verification flag value at step S514.

And, if the call server 500 receives the authentication number from the second terminal 600 at step S515, the call server 500 compares the received authentication number with the authentication number stored to corresponding to the second terminal 600 at step S516 and transmits the authentication completion information for the second terminal 600 to the host server 400 if the compared authentication numbers are the same with each other at step S518.

However, if the compared authentication numbers are not the same, the call server 500 checks the verification flag at step S517. In case that the verification flag value is less than two, the call server re-requests the authentication number for the second terminal 600 and performs the steps of verifying the authentication information at steps S513 to S516.

Here, if the checked flag value is two or more, the call server 500 transmits the authentication failure message to the authentication server 300 or the host server 400 at step of S519 and completes all operations.

Meanwhile, according to another embodiment of the present invention, in case that the phone authentication and position check are requested from the authentication server 300, the call server 500 further includes the steps of requesting the position check to the communication server 700, receives the position information of the second terminal 600 from the communication server 700 and transmits the position information to the call server 500 in addition to the authentication processes as mentioned in FIG. 8.

FIG. 9 is a flow chart illustrating an operation of a call server in accordance with another embodiment of the present invention.

As shown in FIG. 9, if the call server 500 receives the phone authentication from the authentication server 300 at step S601, in case that the second terminal 600, of which number is registered when the user corresponding to the first terminal 100 previously contracts the use with the service providing agency on off-line, is a number for a corporate finance at step S602, the call server 500 generates an authentication call to the second terminal at step S603.

Then, the call server 500 counts a predetermined time at step S604, and if the OTP number is transmitted from the second terminal 600 during a count at step S605, the call server generates an OTP number by the same scheme with the OTP generation scheme of the second terminal 600 at step S606.

And, the call server 500 compares the generated OTP number with the OTP number transmitted from the second terminal 600 at step S607. If the compared OTP numbers are the same with each other, the call server 500 transmits the authentication completion information for the second terminal to the host server 400 at step S608, and if the compared OTP numbers are not the same, the call server 500 transmits the authentication failure message to the authentication server 300 or the host server 400 at step S609.

Moreover, in case that the OTP number is not transmitted from the second terminal 600 during a count, the call server 500 generates and transmits the authentication failure message to the authentication server 300 or the host server 400 at step S610.

FIG. 10 is a block diagram illustrating a preliminary transaction flow in a preliminary verification system under an Internet environment using a phone authentication service in accordance with an embodiment of the present invention. FIG. 11 is a block diagram illustrating a real transaction flow in a preliminary verification system under an Internet environment using a phone authentication service in accordance with an embodiment of the present invention. FIG. 12 is a block diagram illustrating a real approval flow in a preliminary verification system under an Internet environment using a phone authentication service in accordance with an embodiment of the present invention. FIG. 13 is a block diagram illustrating a real transaction result notification flow in a preliminary verification system under an Internet environment using a phone authentication service in accordance with an embodiment of the present invention.

As shown in FIGS. 10 to 13, transaction information (e.g., an account PIN number, a deposit account number, a deposit money and a receiver) of a transfer commander (e.g., a fist terminal) 100 is transmitted to the authentication server 300 through Internet, a transfer preliminary transaction is performed with one-bank host server 400. In case of two-bank transfer, an information exchange and transaction information between the one-bank host server 400 and another-bank host server 400 are checked, and a signal which requests a transfer list (e.g., deposit/withdraw account number, deposit money and receiver) may be re-transmitted to the transfer commander.

Figures 14, 15:
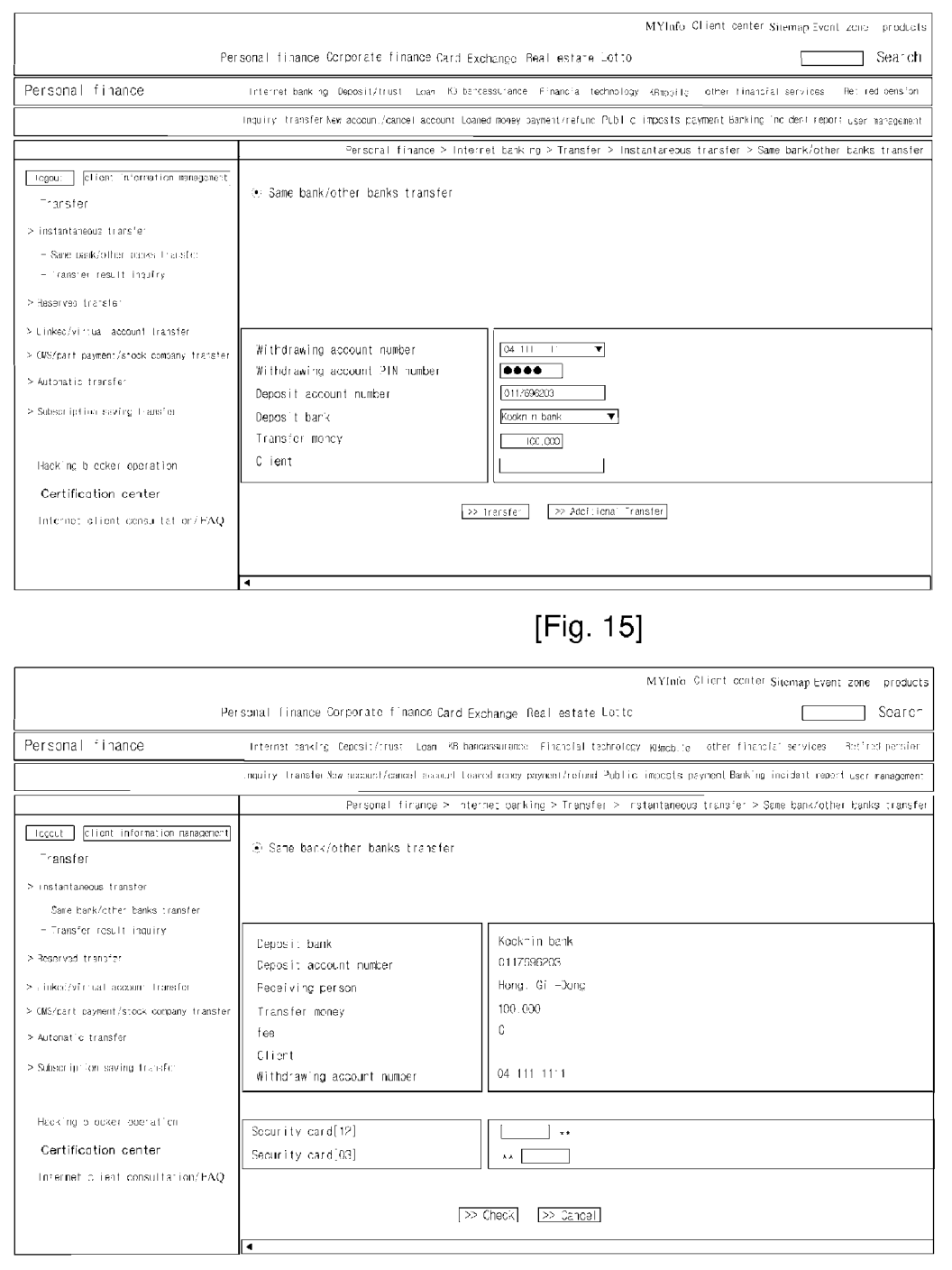

FIGS. 14 to 17 are diagrams illustrating preliminary transaction request screens of an implemented GUI display in accordance with an embodiment of the present invention.

FIG. 14 illustrates a graphic user interface (GUI) displayed on a display screen of the first terminal 100 in a transfer transaction. After each user input information in each input field, if a transfer button is clicked, an event corresponding to the click occurs, and the corresponding information is transmitted to the authentication server 300. FIG. 15 illustrates a GUI of a preliminary transaction response. Response information is transmitted from the host server 400 according to the transmitted preliminary transaction request information.

Figures 16, 17:
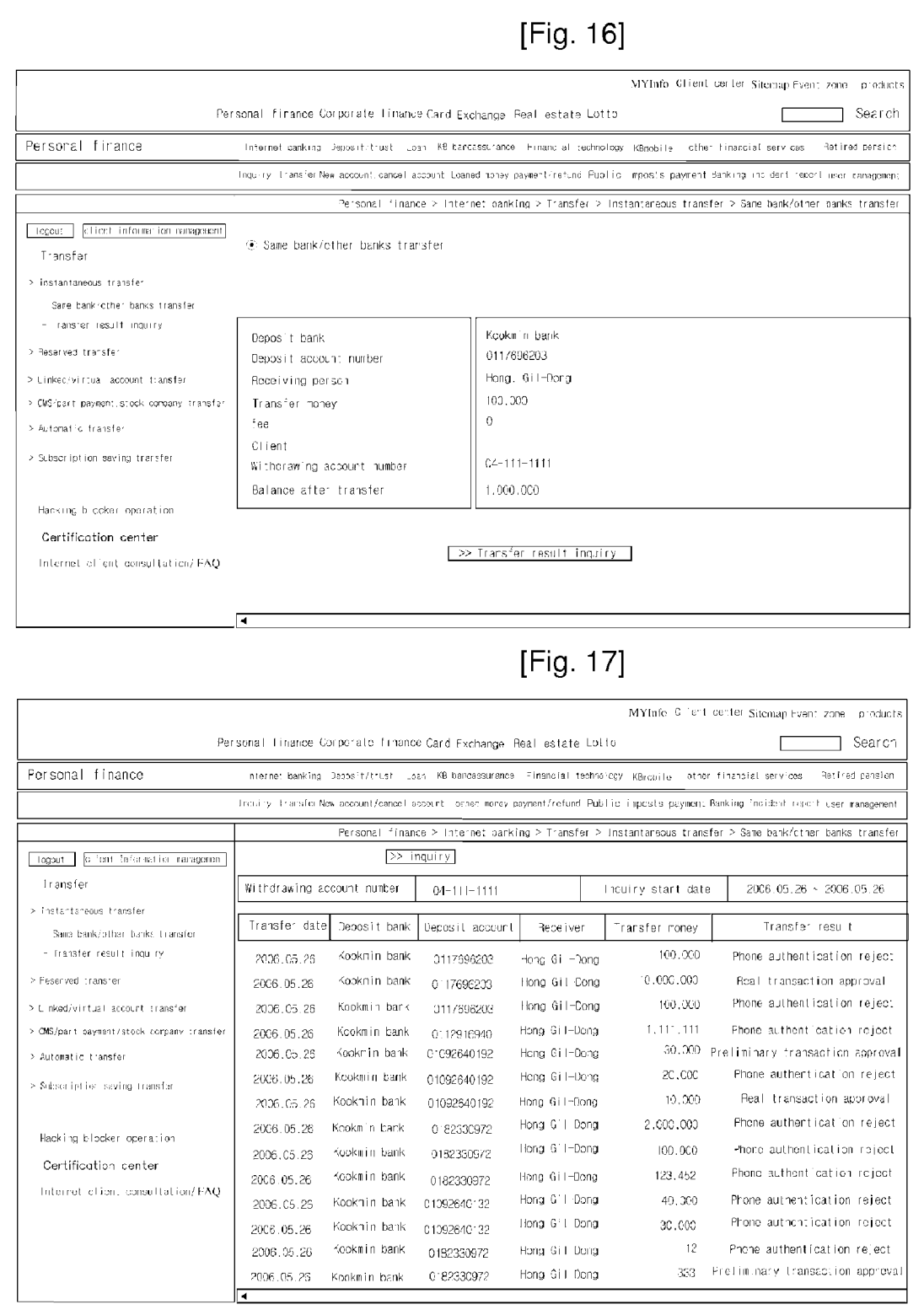

Moreover, FIG. 16 illustrates a GUI of a real transaction response, and FIG. 17 illustrates a GUI of a transaction result inquiry GUIS and enables a user to check and mange the result on a graphic screen.

FIGS. 18 to 21 are diagrams illustrating preliminary transaction request screens of an implemented GUI display in accordance with another embodiment of the present invention.

That is, in case that a preliminary verification is performed through Internet using the phone authentication service, FIG. 18 to 21 illustrate a GUI of a information request of the second terminal 600 which is performed before or after an initial preliminary transaction information is input so that the service of the present invention is provided in case that he number of the second terminal 600 is not input when a user previously contacts the use with the service providing agency on off-line.

Accordingly, FIGS. 18 and 19 are GUIs which the number of the second terminal 600 and a main address for sending a post-service result mail are input. FIG. 20 is a GUI which is displayed on a screen display of the first terminal 100 from the authentication server 300, and enables a user to check the authentication number which is requested for the phone authentication. And, the FIG. 21 shows a GUI of a transaction information input GUI displayed on the display screen of the first terminal 100 after the authentication number is issued.

On the other hand, FIG. 22 is a block diagram illustrating a user database of a host server in accordance with an embodiment of the present invention. As shown in FIG. 22, the host server 400 analyzes a transaction position pattern of the second terminal 600 through a database as shown in FIG. 22 and processes the real transaction after checking the second terminal exists on an approval position.

While the present invention has been described with respect to certain preferred embodiments, it will be apparent to those skilled in the art that various changes and modifications may be made without departing from the spirits and scope of the invention as defined in the following claims.

In particular, in case that the verification is performed by the ARS or CTI system, it is preferred that the preliminary verification system under an Internet environment using a phone authentication service is designed so that the preliminary verification system transmits the result to the authentication server, informs the result of the client, and request a continuous performance of the transfer. Moreover, selectively, in application of the present invention, the process may be simplified by transferring directly the verification result of the one-bank host server without the Internet banking server.

Industrial Applicability

As mentioned above, the preliminary verification system under an Internet environment using a phone authentication service in accordance with the present invention is a bidirectional transaction system which improves security and integrity of the authentication by performing a preliminary check, authentication and approval through the ARS after inputting information requested in an electronic financial transaction. The present invention complements a limitation point and a weak point caused by a conventional single direction transaction system, which performs a process if approval is requested simply after authentication information is inputted. The present invention prevents a financial accident perfectly by previously checking, authenticating and approving an occurrence of the banking accident caused by a hacking or prevents transaction rejection by pointing out the limitation of duty and authority of a service provider and a service user.

This bidirectional correlation authentication provides perfect accident prevention, a transaction list preliminary verification and a security authentication service and activates the Internet banking and phone banking of future.

And, the preliminary verification system under an Internet environment using a phone authentication service in accordance with the present invention protects personal information by reinforcing a security in an electronic transaction work which authenticates various check and issuance to an authorized user through the verification. The present invention re-checks willing of a user by reinforcing the authentication in the use of registration of various services. The present invention defines the duty and authority of the service provider and the service user by previously performing authentication of a specific authorized person in case that the authority of the user is limited.

In accordance with an embodiment of the present invention, if the present invention is applied to a work which issues or directly reads various information of electronic transition type on Internet, a user himself or a person having a specific authority checks and safely and flawlessly a proper issue requester based on a preliminary authentication through the ARS.

In accordance with another embodiment of the present invention, if the present invention is applied to an administration work, in an issue work of a resident registration record which confines a reading or issuing to protect private information, a proper issue requester is checked safely and flawlessly based on a preliminary authentication through the ARS by indicating a householder or a person having a specific authority.

In accordance with another embodiment of the present invention, if the present invention is applied to a medial work, in case of reading and issuing private information in a certificate issuing work of a hospital, a proper issue requester is checked safely and flawlessly based on a preliminary authentication through the ARS by indicating a guardian or a person having a specific authority.

In accordance with another embodiment of the present invention, if the present invention is applied to an education and school affairs, in case of issuing a result certificate, an illegal access and extraction is blocked by checking safely and flawlessly a proper issue requester based on a preliminary authentication through the ARS by indicating a guardian or a person having a specific authority.

In accordance with another embodiment of the present invention, if the present invention is applied to a public work, in case of issuing a transcript of the register, an efficiency of the work may be improved according to the limitation of an illegal use of other's name or an illegal forgery/alteration and an issue abuse by indicating an owner of the real estate or a person having a specific authority and by checking and approving a proper approval authority based on a preliminary authentication through the ARS.

In accordance with another embodiment of the present invention, if the present invention is applied to an unidirectional medium of a TV home shopping at a general static place, in a home shopping goods purchase the present invention supports a safe and flawless service by indicating a person having an approval authority or a specific authority and by checking and approving a proper approval authority based on a preliminary authentication through the ARS.

In accordance with another embodiment of the present invention, if the present invention is applied to a bidirectional medium of an IPTV (Internet Protocol TV) service at a general static place, in goods purchase and various service of the IPTV, the present invention supports a safe and flawless service by indicating a person having an approval authority or a specific authority and by checking and approving a proper approval authority based on a preliminary authentication through the ARS.

In accordance with another embodiment of the present invention, if the present invention is applied to a bidirectional medium of a satellite DMB (Digital Multimedia Broadcasting) service at a general dynamic place, in goods purchase and various service of the DMB, the present invention supports a safe and flawless service by indicating a person having an approval authority or a specific authority and by checking and approving a proper approval authority based on a preliminary authentication through the ARS.

In accordance with another embodiment of the present invention, if the present invention is applied to a chargeable service subscription and use of information communication service provider using wire/wireless device, the present invention supports a safe and flawless service by indicating a person having an approval authority or a specific authority and by checking and approving a proper approval authority based on a preliminary authentication through the ARS.

In accordance with another embodiment of the present invention, if the present invention is applied to the subscription and use of an automatic changeable service into a chargeable service after no chargeable service for a predetermined time, the present invention supports a safe and flawless service by indicating a person having an approval authority or a specific authority and by checking and approving a proper approval authority based on a preliminary authentication through the ARS.

On the other hand, in case of reading or issuing work of various information of electronic transaction type, although a user is accessed through a certificate authentication, the present invention performs a bidirectional correlation preliminary verification above the limitation of the single direction approval of a conventional certificate authentication by performing a preliminary authentication process through the ARS by additionally user or a specific authorized person in case of being requested according to the present invention.

The invention claimed is:

1. A preliminary verification system under an Internet environment using a phone authentication service, comprising:
   a first terminal connected to the Internet;
   a web server for interfacing the first terminal to be accessible for a site which needs a transaction access for authentication;
   an authentication server for performing the authentication for an electronic transaction requested from the first terminal via the web server;
   a host server connected to the authentication server for processing the electronic transaction requested from the first terminal; and
   a call server implemented by a computer and telephony integration (CTI) and an advanced record system (ARS) which are called through telephone network for accessing to a second terminal of a user of the first terminal which the electronic transaction is requested, receiving approval of the electronic transaction, receiving and verifying an authentication number according to the approval of the electronic transaction, and performing a phone authentication which provides authentication completion information according to the verification to the host server,
   wherein the host server performs the electronic transaction process according to the authentication completion information provided from the call server.

2. The system as recited in claim 1, wherein the authentication server is an Internet banking server or a verification server.

3. The system as recited in claim 1, wherein the host server is at least one of a financial agency server, a government and public offices server, an educational matters server, a medical information management server, an administration information management server, a television (TV) home shopping server, an internet protocol TV (IPTV) server, a satellite digital multimedia broadcasting (DMB) server and an information communication server.

4. The system as recited in claim 1, wherein the authentication server requests a phone authentication of the second terminal to the call server and transmits a phone authentication request status to the host server according to the phone authentication request if the user authentication of the first terminal is completed.

5. The system as recited in claim 1, wherein the second terminal is called from the call server through a mobile wireless communication network (MWCN) or a public switched telephone network (PSTN), and is registered by a use which is previously contracted with a phone number service providing agency.

6. The system as recited in claim 1, wherein the call server checks position information of the second terminal through a communication server, and further provides the position information to the host server.

7. The system as recited in claim 6, wherein the host server performs the electronic transaction process in case that the host server exists on an approval position after analyzing a transaction position pattern from the position information of the second terminal provided from the call server.

8. The system as recited in claim 1, wherein the second terminal has a one time password (OTP) device which automatically generates and transmits an OTP number in case of a phone for a corporate banking.

9. The system as recited in claim 1, wherein the call server generates an authentication call which requests an OTP number to the second terminal, receives the OTP number corresponding to the generated authentication call from the second terminal, and generates an OTP number by the same scheme with an OTP device if it is determined that the second terminal includes a phone number for the corporate banking, and wherein the call server transmits the authentication completion information to the host server if the generated OTP number is the same with the received OTP number.

10. A preliminary verification system under an Internet environment using a phone authentication service, comprising:
   a first terminal connected to the Internet;
   a web server for interfacing the first terminal to be accessible for a site which needs a transaction access for authentication;
   an authentication server for performing the authentication for an electronic transaction requested from the first terminal via the web server;
   a host server connected to the authentication server for processing the electronic transaction requested from the first terminal; and
   a call server implemented by a computer and telephony integration (CTI) and an advanced record system (ARS) which are called through telephone network for accessing to a second terminal of a user of the first terminal which the electronic transaction is requested, receiving approval of the electronic transaction, receiving and verifying an authentication number according to the approval of the electronic transaction, acquiring position information of the second terminal through a communication server, and providing the acquired position information and authentication completion information according to the verification to the host server,
   wherein after analyzing a transaction position pattern from the position information of the second terminal, the host server performs the electronic transaction process if it is determined that the second terminal exists on an approval position.

11. A preliminary verification system under an Internet environment using a phone authentication service, comprising:
   a first terminal connected to the Internet;
   a second terminal having a one time password (OTP) device which automatically generates and transmits an OTP number;
   a web server for interfacing the first terminal to be accessible for a site which needs a transaction access for authentication;
   an authentication server for performing the authentication for an electronic transaction requested from the first terminal via the web server;
   a host server connected to the authentication server for processing the electronic transaction requested from the first terminal; and
   a call server implemented by a computer and telephony integration (CTI) and an advanced record system (ARS) which are called through telephone network for generating an authentication call to a second terminal of a user of the first terminal which the electronic transaction is requested, receiving an OTP number corresponding to the authentication call from the second terminal, generating an OTP number by the same scheme with an OTP device, transmitting authentication completion information to the host server if the generated OTP number is the same with the received OTP number, wherein the host server performs the electronic transaction process according to the authentication completion information received from the call server.

12. A preliminary verification method under an Internet environment using a phone authentication service in a system including a first terminal, a web server, an authentication server, a host server, a call server and a second terminal, the method comprising the steps of:

provinding a preliminary transaction request generated from the first terminal to the authentication server through the web server;

at the authentication server, transmitting the preliminary transaction request information to the host server, and providing preliminary transaction result information corresponding to the preliminary transaction request information from the host server to the first terminal;

at the authentication server, in case of receiving a real transaction request generated from the first terminal, receiving and verifying the authentication information from the first terminal according to the electronic transaction approval, and requesting a phone authentication for the second terminal of the user of the authenticated first terminal to the call server;

at the call server, receiving approval of the transaction from the second terminal, receiving and verifying an authentication number according to the approval, and providing the authentication completion information to the host server according to the verification; and at the host server, performing the electronic transaction process according to the authentication completion information received from the call server.

13. The method as recited in claim 12, wherein the authentication server informs the phone authentication request status of the host server according to the phone authentication request after requesting the phone authentication for the second terminal to the call server.

14. The method as recited in claim 12, further comprising the steps of:

at the authentication server, requesting position information for the second terminal to the call server;

at the call server, checking position information of the second terminal through a communication server and providing the position information to the host server; and at the host server, after analyzing a transaction position pattern from the position information of the second terminal provided from the call server, performing the electronic transaction process in case that the transaction position pattern exists on an approval position.

15. The method as recited in claim 12, further comprising the steps of:

at the call server, generating an authentication call to the second terminal which requests a one time password (OTP) number in case that the second terminal includes a phone number for a corporate banking;

at the call server, receiving the OTP number corresponding to the authentication call from the second terminal; and at the call server, generating an OTP number by the same scheme with an OTP device, and transmitting the authentication completion information to the host server if the generated OTP number is the same with the received OTP number.

16. A preliminary verification method under an Internet environment using a phone authentication service in a system including a first terminal, a web server, an authentication server, a host server, a call server and a second terminal, the method comprising the steps of:

providing a preliminary transaction request generated from the first terminal to the authentication server through the web server;

at the authentication server, transmitting the preliminary transaction request information to the host server, and providing preliminary transaction result information corresponding to the preliminary transaction request information from the host server to the first terminal;

at the authentication server, in case of receiving a real transaction request generated from the first terminal, receiving and verifying the authentication information from the first terminal according to the electronic transaction approval, and requesting a phone authentication for the second terminal of the user of the authenticated first terminal to the call server;

at the call server, receiving approval of the transaction from the second terminal, receiving and verifying an authentication number according to the approval, acquiring the position information of the second terminal from a communication server, and providing the acquired position information and authentication completion information according to the verification to the host server; and at the host server, after analyzing a transaction position pattern which is provided from the authentication completion information and the position information of the second terminal, if it is determined that the second terminal exists on an approval position, performing the electronic transaction process.

17. A preliminary verification method under an Internet environment using a phone authentication service in a system including a first terminal, a web server, an authentication server, a host server, a call server and a second terminal, the method comprising the steps of:

providing a preliminary transaction request generated from the first terminal to the authentication server through the web server;

at the authentication server, transmitting the preliminary transaction request information to the host server, and providing preliminary transaction result information corresponding to the preliminary transaction request information from the host server to the first terminal;

at the authentication server, in case of receiving a real transaction request generated from the first terminal, receiving and verifying the authentication information from the first terminal according to the electronic transaction approval, and requesting a phone authentication for the second terminal of the user of the authenticated first terminal to the call server;

at the call server, generating an authentication call to the second terminal, receiving a one time password (OTP) number corresponding to the authentication call from the second terminal, generating an OTP number by the same number of an OTP device, and transmitting authentication completion information to the host server if the generated OTP number is the same with the received OTP number; and at the host server, performing the electronic transaction process according to the authentication completion information received from the call server.

* * * * *